United States Patent
Hyodo

(10) Patent No.: US 7,670,124 B2
(45) Date of Patent: Mar. 2, 2010

(54) METAL MOLD FOR VULCANIZING TIRE TREADS

(75) Inventor: Masaki Hyodo, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 192 days.

(21) Appl. No.: 12/106,394

(22) Filed: Apr. 21, 2008

(65) Prior Publication Data
US 2008/0299240 A1    Dec. 4, 2008

(30) Foreign Application Priority Data
May 29, 2007    (JP)    ............... 2007-142119

(51) Int. Cl.
*B29C 35/02*    (2006.01)
(52) U.S. Cl. ............................................. 425/46
(58) Field of Classification Search ............. 425/28.1, 425/35, 46, 47
See application file for complete search history.

(56) References Cited

U.S. PATENT DOCUMENTS 2,297,017 A  *   9/1942  Overman .................. 425/46
5,234,326 A  *   8/1993  Galli et al. ................ 425/46
5,290,163 A  *   3/1994  Katsumata et al. ........ 425/47
5,980,810 A  *  11/1999  Ladouce ................... 425/46
7,118,702 B2 * 10/2006  Marchadier et al. ...... 425/46

FOREIGN PATENT DOCUMENTS

JP    05-200753    8/1993
JP    07-314459    12/1995

* cited by examiner

*Primary Examiner*—James Mackey
(74) *Attorney, Agent, or Firm*—Fish & Richardson P.C.

(57) ABSTRACT

A metal mold for vulcanizing tire treads reliably preventing incorrect assembling of split pieces. The metal mold 1 for vulcanizing tire treads to form a tread of a tire, comprises a plurality of sector molds 3 equipped with a plurality of pieces 6 which are arranged on the inner circumferential surface of a casing 5 and are split in the circumferential direction in which a tread pattern of the tire is formed, wherein among the adjacent pieces 6 in the sector molds 3, a protuberance 8 is formed on the contact surface of the one piece 6, a dent 9 corresponding to the protuberance 8 is formed in the contact surface of the another piece 6, and the positions for forming the protuberance 8 and the dent 9 are differed for each of the adjacent pieces 6 in the sector molds 3.

3 Claims, 4 Drawing Sheets

METAL MOLD FOR VULCANIZING TIRE TREADS

BACKGROUND OF THE INVENTION

1. Field of the Invention

This invention relates to a vulcanizing metal mold for vulcanizing and molding raw tires and, specifically, to a metal mold for vulcanizing tire treads, which is constituted by a plurality of sector molds for molding treads of tires. More particularly, the invention relates to a metal mold for vulcanizing tire treads, capable of preventing incorrect assembling of a plurality of pieces attached to a casing for molding a tread pattern.

2. Description of the Related Art

A metal mold of the type split in the circumferential direction has heretofore been known as a metal mold for vulcanizing the tires. The metal mold of this type is provided with many apertures called vent holes for venting the air communicated with the interior and exterior of the metal mold to discharge a gas such as the air trapped between the metal mold and the raw tire out of the metal mold while the tire is being vulcanized. However, the vent holes are formed through a step of forming many vent holes in the metal mold. Besides, the spews that are cut often remain in the vent holes.

To overcome the cumbersome maintenance of the above metal mold, JP-A-5-200753 discloses a metal mold for vulcanizing tires in which many segment pieces are formed by turning an aluminum alloy material forming a tread-molding portion necessary for forming a tire pattern and cutting and splitting it in the circumferential direction, and many segment pieces are assembled on the inside of a holder made of iron, the many segment pieces being held maintaining such a gap that permits the passage of the air but blocks the rubber.

Even with the metal mold split into the pieces, however, the rubber adheres on the surfaces of the metal mold and in the air-venting gaps among the pieces like the ordinary metal mold for vulcanizing the tires after the tires are vulcanize-molded several hundreds to several thousands of times, impairing the appearance of the obtained tires and lowering the venting effect, still requiring the washing of the metal mold at regular intervals.

As for the tread patters of the tires, on the other hand, the pitch of pattern is differed in a state of maintaining similar patterns that are to be formed, usually, dividing the circumferential length of the tire into not less than 50 pitches while employing not less than three kinds of pitches in order to suppress vibration and noise of the tire while traveling. Therefore, the split pieces having different pattern pitches must be regularly arranged adjacent to each other in the metal mold for molding the tread. At the time of assembling the metal mold after the washing, therefore, the split pieces must be very carefully arranged to prevent incorrect assembling, which is a time-consuming work.

Therefore, JP-A-7-314459 is proposing a metal mold for vulcanizing tires, which facilitates easy and quick washing of the metal mold and assembling of the metal mold.

In order to prevent incorrect assembling of the split pieces, so far, characters for identification have been engraved at positions other than the surface for forming the tread enabling the pieces to be rearranged by making sure the characters but still inviting the chances for incorrectly arranging the pieces.

Further, according to JP-A-7-314459, the pieces can be positioned, but incorrect assembling cannot be confirmed until after the pieces are set in the casing. Besides, limitation is imposed on the direction for inserting the pieces in the casing, still leaving room for improvement.

SUMMARY OF THE INVENTION

To solve the above problems, it is an object of the present invention to provide a metal mold for vulcanizing tire treads, which, after having been washed, can be easily and quickly assembled reliably preventing incorrect assembling of a plurality of split pieces.

In order to achieve the above object, the present inventors have conducted a keen study, have discovered that incorrect assembling can be prevented by providing the contact surfaces of pairs of pieces with protuberances and corresponding dents, respectively, and have finished the present invention.

According to one aspect of the present invention, there is provided a metal mold for vulcanizing tire treads to form a tread of a tire, comprising a plurality of sector molds equipped with a plurality of pieces which are arranged on the inner circumferential surface of a casing and are split in the circumferential direction in which a tread pattern of the tire is formed, wherein among the adjacent pieces in the sector molds, a protuberance is formed on the contact surface of the one piece, a dent corresponding to the protuberance is formed in the contact surface of the another piece, and the positions for forming the protuberance and the dent are differed for each of the adjacent pieces in the sector molds.

A second aspect of the present invention is concerned with the metal mold for vulcanizing tire treads of the first aspect, wherein the protuberance comprises at least one pin protruded on the contact surface, and the dent comprises a pin hole in which the pin is to be inserted.

A third aspect of the present invention is concerned with the metal mold for vulcanizing tire treads of the first or second aspect, wherein any one of a plurality of pieces arranged in the sector mold has at least one protuberance protruding on the surface thereof that slides relative to the casing, a circumferential groove in which the protuberance slides being fitted thereto is formed in the inner circumferential surface of the casing, and the positions for setting the protuberance and the slide groove are differed for each of the sector molds.

DETAILED DESCRIPTION OF THE INVENTION

An embodiment of the invention will now be described with reference to the drawings.

Figure 1:
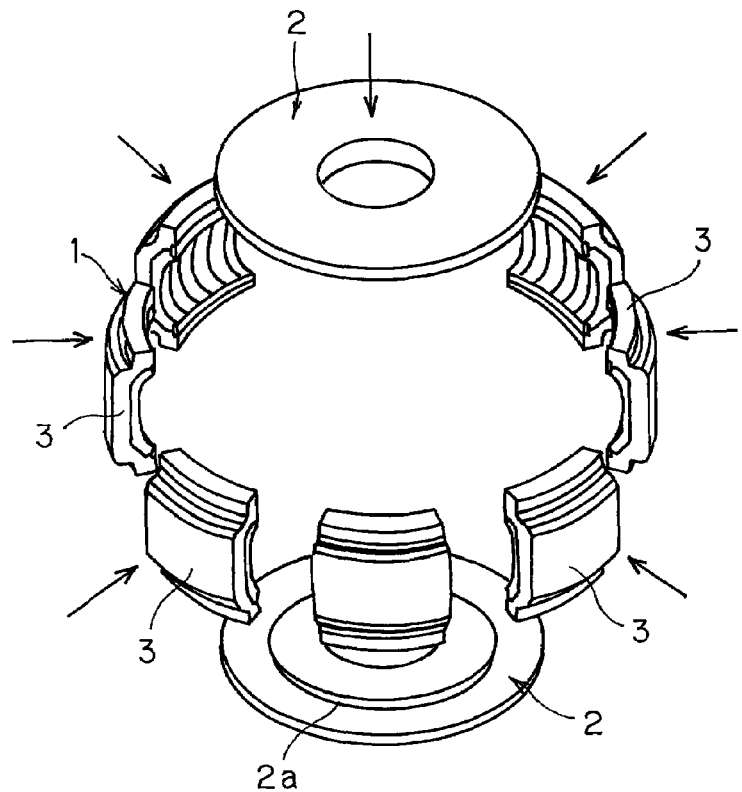
FIG. 1 is a perspective view schematically illustrating a metal mold for vulcanizing tire treads.

FIG. 1 is a perspective view schematically illustrating a metal mold for vulcanizing a tire tread together with a pair of side metal molds for vulcanization according to an embodiment of the present invention, wherein reference numeral 1 denotes a metal mold for vulcanizing a tire tread according to the invention, and reference numeral 2 denotes a pair of side metal molds for vulcanization.

The metal mold 1 for vulcanizing the tire tread comprises a plurality of (eight in the drawing) sector molds 3 which can be horizontally moved in the radial direction so as to expand or contract. Adjacent sector molds 3 closely adhere to each other. When contracted in diameter, therefore, the sector molds 3 as a whole constitute a circular shape and, in the drawing, work to vulcanize and mold a raw tire together with the pair of upper and lower side metal molds 2 for vulcanization, thereby to form a tread portion of the finished tire.

Figure 2:
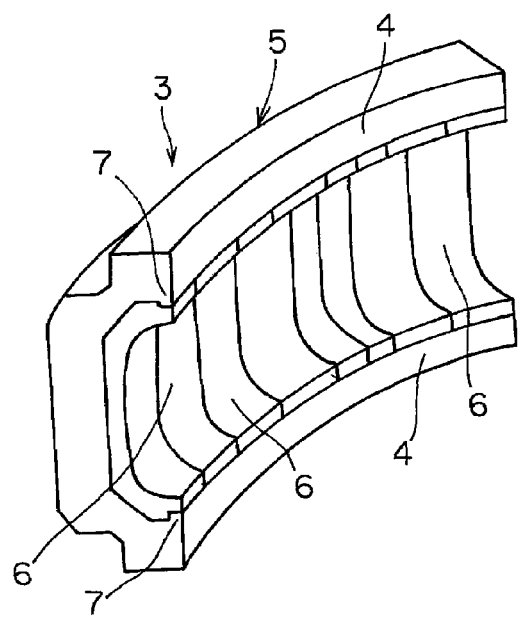
FIG. 2 is a perspective view schematically illustrating a sector mold.

FIG. 2 is a perspective view schematically illustrating one of the sector molds 3 of nearly an arcuate shape, which comprises a casing 5 having contact surfaces 4 that protrude inward in the radial direction on the inner circumferential surfaces of the side portions or at the upper and lower end portions in the drawing to come in contact with outer circumferential surfaces 2a of the side vulcanizing and molding portions of the side vulcanizing metal molds 2 to seal a space that is formed, and a plurality of (eight in the drawing) pieces 6 mutually arranged on the inner circumferential surface between the two side portions of the casing 5. The pieces 6 positioned and fixed on the inner circumferential surface of the casing 5 form a tread pattern of a finished tire when the raw tire is vulcanized and molded.

The plurality of pieces 6 are attached to the casing 5 in a manner that both ends of each piece 6 are simultaneously engaged with rail-like protruded portions 7 at the inner circumferential edge portions of the surfaces 4 that come in contact with the side vulcanizing metal molds 2 of the casing 5, so that both ends of each of the pieces 6 are held by the protruded portions 7.

Figure 3:
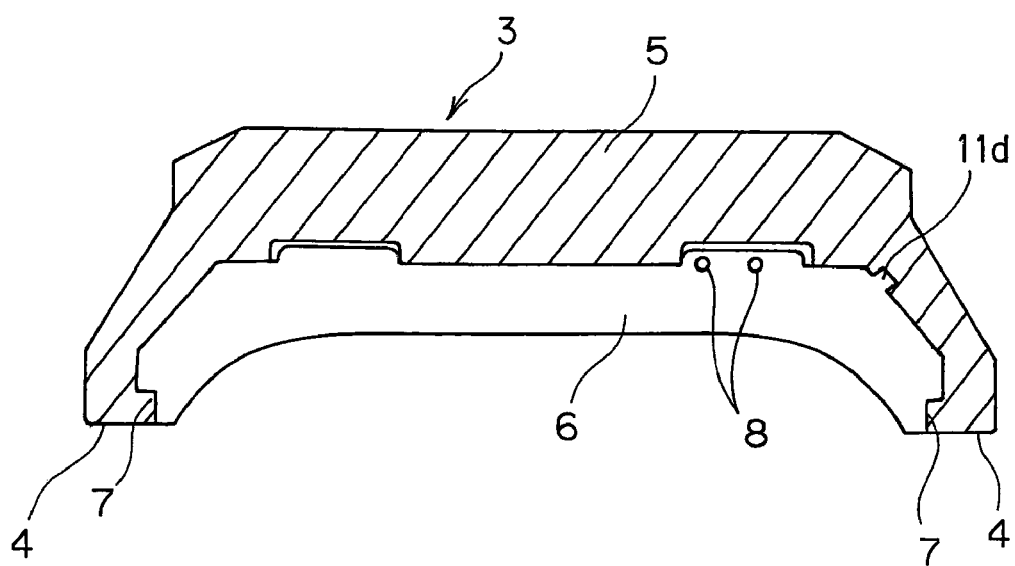
FIG. 3 is a sectional view illustrating a portion of the sector mold according to an embodiment.
Figure 4:
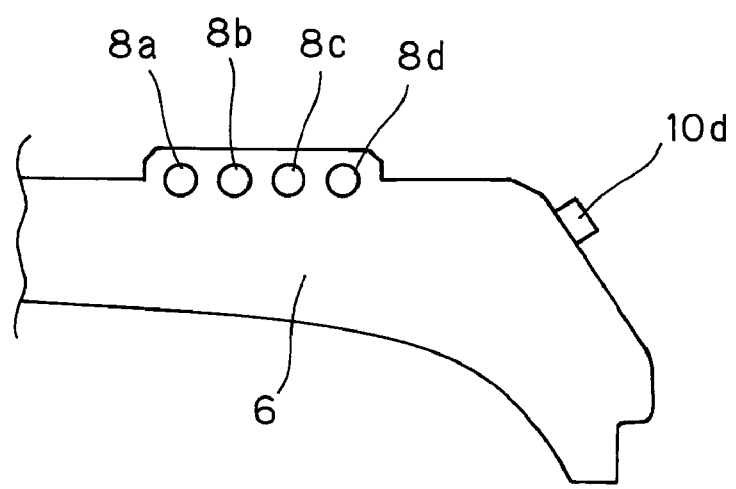
FIG. 4 is a view illustrating, on an enlarged scale, a portion of a surface that comes in contact with a piece according to the embodiment.

FIG. 3 is a sectional view of a contact portion of a piece 6 in the sector mold 3, and FIG. 4 is a view illustrating, on an enlarged scale, a portion of the piece 6.

As shown, the contact surface of the piece 6 has protuberances 8 at two places protruding toward the adjacent piece, and dents in which the protuberances 8 will be inserted are formed at two places in the contact surface of the adjacent piece corresponding to the protuberances 8 at two places.

Referring to FIG. 4, the positions for providing the protuberances 8 can be arbitrarily selected from the positions 8a to 8d at four places on the contact surface of the piece 6. Dents in which the protuberances 8 will be inserted are formed in the contact surfaces of the pair of adjacent pieces being corresponded to the protuberances 8, and the positions of the protuberances 8 are set to be different for each of the pairs of pieces in the sector mold 3.

When the dents and protuberances are not corresponded between the two adjacent pieces, therefore, the ends of the pieces do not come in contact and cannot be assembled into a pair. It is therefore made possible to correctly arrange the plurality of pieces 6 reliably preventing incorrect assembling of the pieces.

There is no particular limitation on the positions for forming the protuberances 8 and the corresponding dents in the contact surfaces of the pieces. There is no limitation on the number thereof, either. The embodiment shown in FIG. 4 has protuberances 8 at four places. However, the protuberances 8 may be formed at one or more places, and it is free to select their positions, their number and a combination of the shapes thereof.

Figure 5:
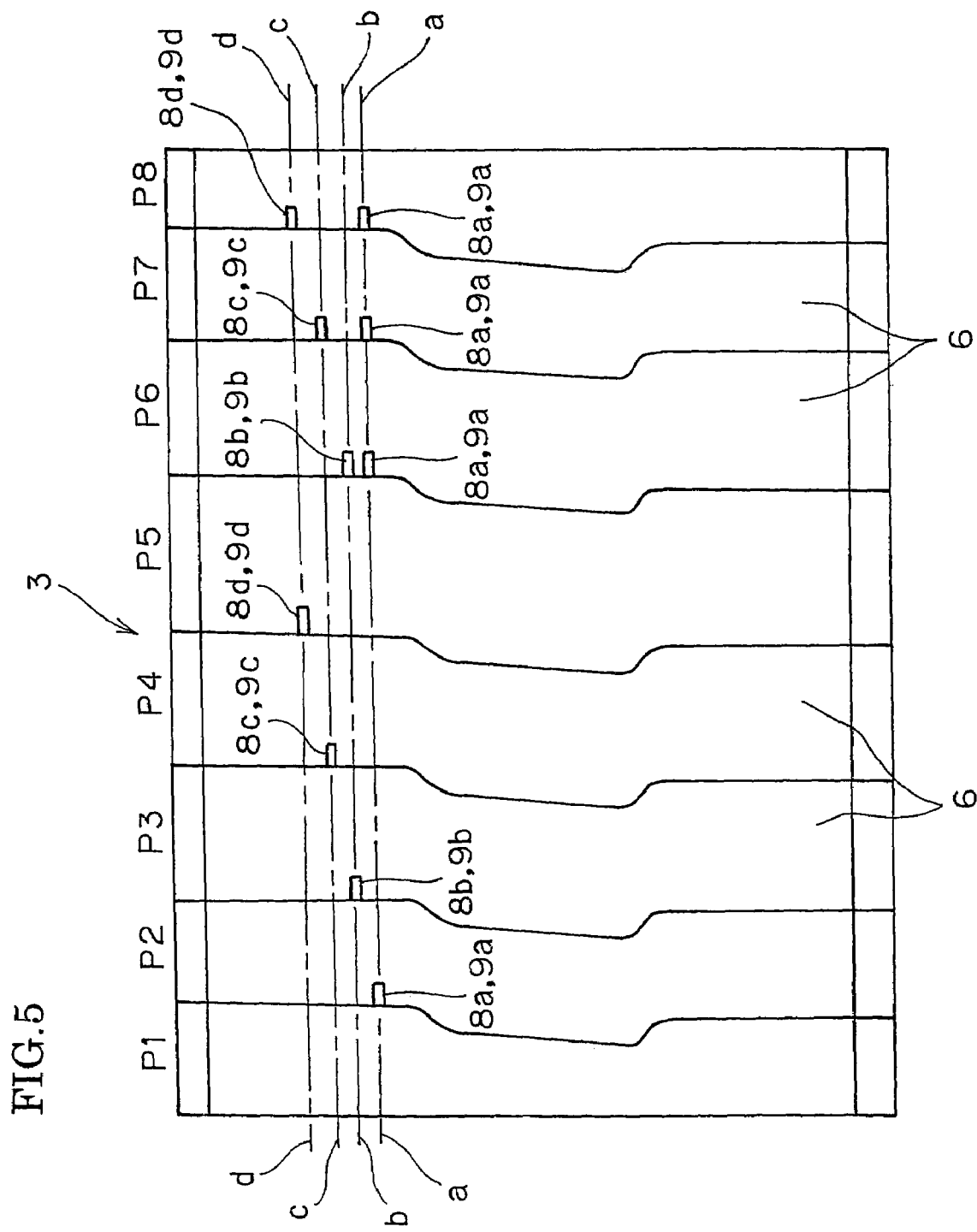
FIG. 5 is a view illustrating the arrangement of an assembly of a frame by using the pieces according to the embodiment.

FIG. 5 is a view illustrating the positions for setting the protuberances 8 and the corresponding dents 9. The protuberances 8 and the corresponding dents 9 are provided on the contact surfaces of eight split pieces P1 to P8 but at different positions. That is, the protuberance 8 and the dent 9 are provided at positions 8a and 9a between the pieces P1 and p2, at positions 8b and 9b between the pieces P2 and P3, at positions 8c and 9c between the pieces P3 and P4, at positions 8d and 9d between the pieces P4 and P5, at positions 8a, 8b and 9a, 9b between the pieces P5 and P6, at positions 8a, 8c and 9a, 9c between the pieces P6 and P7, and at positions 8a, 8d and 9a and 9d between the pieces P7 and P8, and the protuberances 8 are inserted in the dents 9 at the time of assembling the metal mold.

This prohibits the combination of the protuberances 8 and the dents 9 between improper pieces 6 preventing the occurrence of careless miss.

The pieces can be further divided as shown in, for example, in Table 1. Though Table 1 shows a case of fifteen pieces, it should be noted that the number of division is in no way limited thereto only, and the numbers of dents and protuberances and their positions can be varied to meet the number of division.

TABLE 1

| | Between the pieces | P1 and P2 | P2 and P3 | P3 and P4 | P4 and P5 | P5 and P6 | P6 and P7 | P7 and P8 |
|---|---|---|---|---|---|---|---|---|
| Protuberances and dents | a | ● | | | | ● | ● | ● |
| | b | | ● | | | ● | | |
| | c | | | ● | | | ● | |
| | d | | | | ● | | | ● |

| | Between the pieces | P8 and P9 | P9 and P10 | P10 and P11 | P11 and P12 | P12 and P13 | P13 and P14 | P14 and P15 |
|---|---|---|---|---|---|---|---|---|
| Protuberances and dents | a | | | | ● | ● | ● | |
| | b | ● | ● | | ● | ● | | ● |
| | c | ● | | ● | ● | | ● | ● |
| | d | | ● | ● | ● | ● | ● | ● |

●: Represents the positions of protuberances and dents.

The pieces 6 according to the invention are inserted along the rail-like protruded portions 7 of the casing 5 that engage simultaneously with both ends of each of the pieces 6. Therefore, the direction in which the pieces 6 are inserted is not limited. That is, the pieces can be inserted from both the right and left directions in FIG. 2, and the sector mold 3 can be easily assembled.

There is no limitation on setting the protuberances 8 and the corresponding dents 9; i.e., the protuberances 8 may be formed on the contacting surfaces of the pieces 6 and the corresponding dents 9 may be formed in the contact surfaces thereof.

For example, when the protuberances 8 are to be formed at four places as shown in FIG. 4, the protuberances 8 are formed on one end surface of the piece at four places and the dents 9 are formed in the other surface thereof, and the protuberances are cut away leaving the necessary protuberances 8 while burying the dents except the corresponding dents 9.

In the present invention, the protuberances 8 may be pins studded on the contact surfaces of the pieces 6, and the dents 9 may be pin holes in which the pins are to be inserted. In this case, the pins may be screwed as threaded pins into the contact surfaces while the corresponding pin holes may be perforated in the other contact surfaces by using a drill or the like. Thus, the dents and protuberances 8, 9 can be easily formed increasing a degree of freedom for setting the positions making it easy to cope with even such cases where increased numbers of pieces are used.

There is no limitation on the shapes of the dents and protuberances 8, 9, and the protuberances 8 may be of the form of polygonal rods such as of a circle, an ellipse, a square or a pentagon in cross section, may be of a semispherical shape or a conical shape such as a cone, a triangular cone or a square cone, or may be of the form of protruded ridges.

Further, in the present invention as shown in FIGS. 3 and 4, the plurality of pieces 6 arranged in the sector mold 3 may be provided with protuberances 10 protruding on the surfaces that slide relative to the casing 5 in which they are to be incorporated, and a circumferential groove 11 may be formed in the inner circumferential surface of the casing 5, so that the protuberances 10 engage therewith and slide therein.

In this case, there is no limitation on the positions for setting the protuberances 10 and the slide groove 11 that engages therewith and the numbers thereof provided they are formed on the surfaces of the pieces 6 and in the inner slide surface of the casing 5. Upon setting the protuberances 10 and the slide grooves 11 differently for each of the sector molds 3, it is not allowed to assemble the plurality of pieces 6 arranged in the casings 5 constituting the plurality of sector molds 3 unless the protuberances 10 and the slide grooves 11 come in agreement with each other, and it is made possible to reliably prevent incorrect assembling of the sector molds 3.

The protuberance 10 may be formed on only one piece 6 among the plurality of pieces 6. Upon also preventing incorrect assembling of the pieces 6, it is made possible to prevent incorrect assembling of the sector molds 3. The protuberance 10 may be provided on all pieces 6, as a matter of course.

Figure 6:
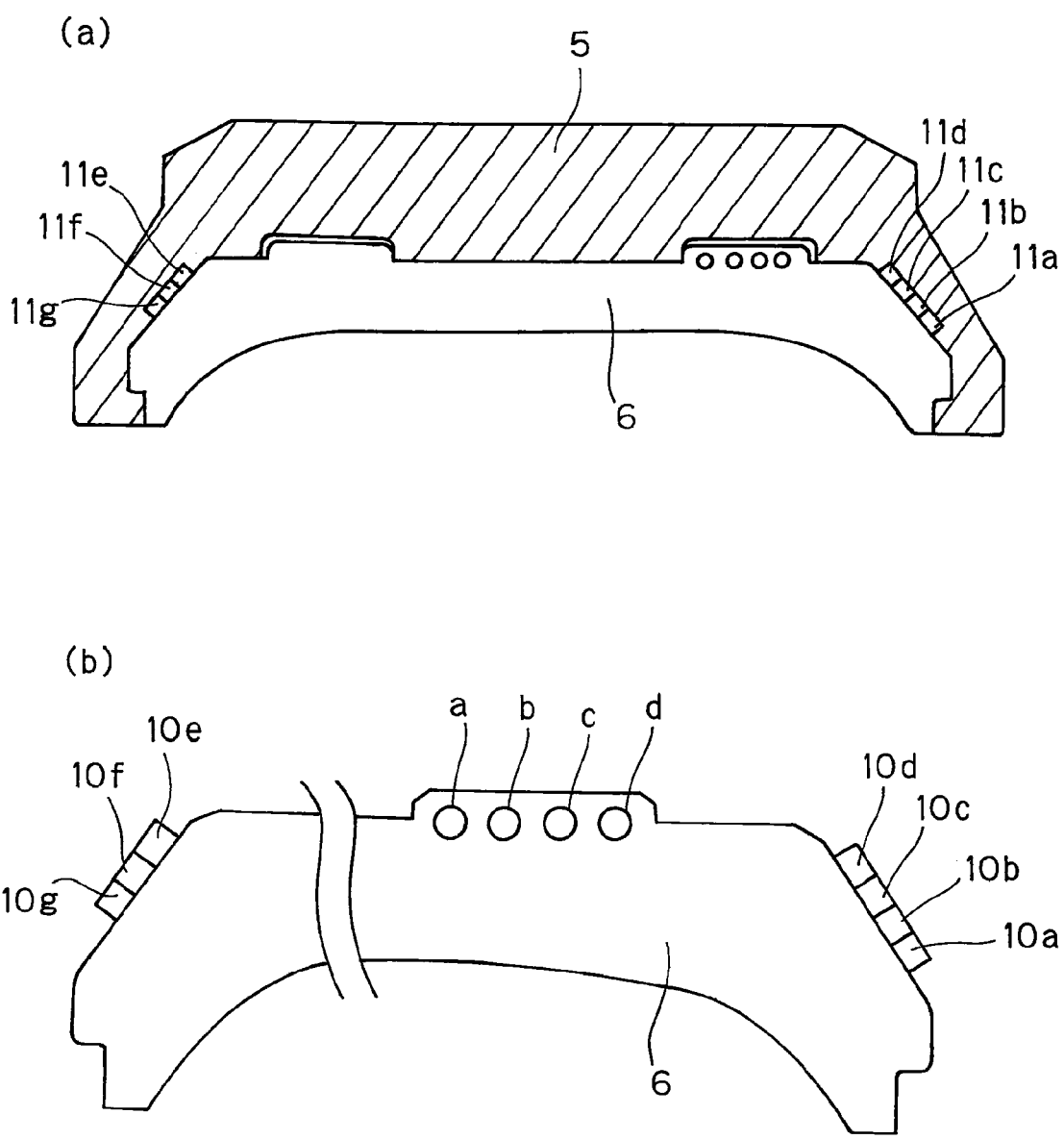
FIG. 6 is a sectional view of a portion of the sector mold according to a second embodiment.

FIG. 6 illustrates an example of when protuberances 10a to 10g are formed at seven places on the slide surfaces on both shoulder portions of the piece 6 and slide grooves 11a to 11g are formed at seven places in the inner circumferential surface of the casing 5. Any position can be selected out of the positions 10a to 10g set at seven places on the slide surfaces of the piece 6, and a slide groove 11 may be provided to correspond thereto, the position of setting the protuberance 10 being differed for each of the sector molds 3.

According to the first aspect of the invention, it is not allowed to assemble the pieces without having corresponding dents and protuberances reliably preventing incorrect assembling that stems from careless miss at the time of assembling the frame of pieces. Further, no limitation is imposed on the direction of inserting the plurality of pieces in the casing, and the sector mold can be easily assembled.

According to the second aspect of the invention, the protuberances are formed as pins and the dents are formed as pin holes in which the pins are to be inserted facilitating the formation of dents and protuberances. This further increases a degree of freedom for setting the positions making it possible to cope with even such cases where many pieces are used.

According to the third aspect of the invention, the casings constituting the plurality of sector molds and the plurality of pieces to be arranged in the casings cannot be assembled together unless the protuberances come into agreement with the slide grooves, reliably preventing incorrect assembling of the sector molds.

The metal mold for vulcanizing tire tread of the invention can be used for vulcanizing and molding tires for passenger cars, large tires for trucks and buses, and a variety of pneumatic tires for agricultural use, industrial vehicles and construction vehicles.

What is claimed is:

1. A metal mold for vulcanizing tire treads to form a tread of a tire, comprising a plurality of sector molds equipped with a plurality of pieces which are arranged on the inner circumferential surface of a casing and are split in the circumferential direction in which a tread pattern of the tire is formed, wherein
    among the adjacent pieces in the sector molds, a protuberance is formed on the contact surface of one of said adjacent pieces, a dent corresponding to the protuberance is formed in the contact surface of another of said adjacent pieces, and the positions for forming the protuberance and the dent are differed for each of the adjacent pieces in the sector molds.

2. The metal mold for vulcanizing tire treads according to claim 1, wherein the protuberance comprises at least one pin protruded on the contact surface, and the dent comprises a pin hole in which the pin is to be inserted.

3. The metal mold for vulcanizing tire treads according to claim 1 or 2, wherein any one of a said plurality of pieces arranged in the sector mold has at least one additional protuberance protruding on the surface thereof that slides relative to the casing, a circumferential groove in which the additional protuberance slides being fitted thereto is formed in the inner circumferential surface of the casing, and the positions for setting the additional protuberance and the slide groove are differed for each of the sector molds.

* * * * *

UNITED STATES PATENT AND TRADEMARK OFFICE
CERTIFICATE OF CORRECTION

PATENT NO. : 7,670,124 B2
APPLICATION NO. : 12/106394
DATED : March 2, 2010
INVENTOR(S) : Masaki Hyodo It is certified that error appears in the above-identified patent and that said Letters Patent is hereby corrected as shown below:

Column 6
Line 43, after "any one of" delete "a".

Signed and Sealed this

Fourth Day of May, 2010

David J. Kappos
*Director of the United States Patent and Trademark Office*